United States Patent
Kawai et al.

(10) Patent No.: US 10,412,246 B2
(45) Date of Patent: Sep. 10, 2019

(54) IMAGE READING UNIT

(71) Applicants: Takuji Kawai, Kanagawa (JP);
Yasunobu Youda, Kanagawa (JP);
Yohei Osanai, Kanagawa (JP);
Tatsuaki Nagano, Kanagawa (JP);
Satoshi Narai, Kanagawa (JP);
Toshiyuki Horikawa, Kanagawa (JP);
Daisuke Imaki, Tokyo (JP); Takayuki Andoh, Kanagawa (JP); Susumu Miyazaki, Tokyo (JP); Tetsuo Inui, Kawagawa (JP); Yuki Fujii, Kawagawa (JP); Koichi Ono, Kanagawa (JP); Takeshi Shikama, Kanagawa (JP); Shingo Shiramura, Kanagawa (JP); Hideo Tanaka, Kanagawa (JP)

(72) Inventors: Takuji Kawai, Kanagawa (JP);
Yasunobu Youda, Kanagawa (JP);
Yohei Osanai, Kanagawa (JP);
Tatsuaki Nagano, Kanagawa (JP);
Satoshi Narai, Kanagawa (JP);
Toshiyuki Horikawa, Kanagawa (JP);
Daisuke Imaki, Tokyo (JP); Takayuki Andoh, Kanagawa (JP); Susumu Miyazaki, Tokyo (JP); Tetsuo Inui, Kawagawa (JP); Yuki Fujii, Kawagawa (JP); Koichi Ono, Kanagawa (JP); Takeshi Shikama, Kanagawa (JP); Shingo Shiramura, Kanagawa (JP); Hideo Tanaka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 5 days.

(21) Appl. No.: 16/008,432

(22) Filed: Jun. 14, 2018

(65) Prior Publication Data

US 2018/0295247 A1   Oct. 11, 2018

Related U.S. Application Data

(63) Continuation of application No. 15/348,782, filed on Nov. 10, 2016, now Pat. No. 10,027,831.

(30) Foreign Application Priority Data

Nov. 16, 2015  (JP) .................................. 2015-224123
Nov. 7, 2016   (JP) .................................. 2016-217265

(51) Int. Cl.
*H04N 1/04*    (2006.01)
*H04N 1/00*    (2006.01)

(52) U.S. Cl.
CPC ..... *H04N 1/00623* (2013.01); *H04N 1/00588* (2013.01); *H04N 1/00615* (2013.01); *H04N 1/00827* (2013.01); *H04N 2201/0081* (2013.01)

(58) Field of Classification Search
CPC ...................... H04N 1/00623; H04N 1/00588
See application file for complete search history.

(56) References Cited

U.S. PATENT DOCUMENTS 7,806,397 B2   10/2010   Wang et al.
7,971,866 B2    7/2011   Huang et al.
(Continued)

FOREIGN PATENT DOCUMENTS

JP   2000-128367 A   5/2000
JP   2012185661 A    9/2012
(Continued)

*Primary Examiner* — Cheukfan Lee
(74) *Attorney, Agent, or Firm* — Harness, Dickey & Pierce, P.L.C.

(57) ABSTRACT

An image-reading unit includes an original document conveyor that includes a first original document tray to hold an original document to be read, a first original document feeding port to feed the original document placed on the first original document tray, and an original document conveying
(Continued)

path to convey the original document from the first original document feeding port to an original document discharging port. The original document conveyor further includes an openable second original document tray attached near an intermediate portion of the original document conveying path to hold an original document when opened, and a second original document feeding port to feed the original document on the second original document tray. The image-reading unit further includes an image reader to read an image of the original document being conveyed along the original document conveying path.

9 Claims, 10 Drawing Sheets

(56) References Cited

U.S. PATENT DOCUMENTS

| | | | |
|---|---|---|---|
| 8,662,770 B2 | 3/2014 | Asada et al. | |
| 8,861,048 B2 | 10/2014 | Narai et al. | |
| 10,023,412 B2 * | 7/2018 | Nakashima | B65H 3/44 |
| 10,044,898 B2 * | 8/2018 | Osanai | H04N 1/0032 |
| 2006/0157910 A1 * | 7/2006 | Sorenson | B65H 5/26 |
| | | | 271/9.01 |
| 2012/0105925 A1 | 5/2012 | Shirai et al. | |
| 2014/0138898 A1 * | 5/2014 | Maeda | B65H 3/06 |
| | | | 271/3.16 |
| 2014/0347711 A1 | 11/2014 | Narai et al. | |
| 2015/0341515 A1 | 11/2015 | Youda et al. | |
| 2016/0127590 A1 | 5/2016 | Hatayama et al. | |
| 2016/0277624 A1 | 9/2016 | Osanai et al. | |
| 2017/0142271 A1 * | 5/2017 | Kawai | H04N 1/00623 |
| 2017/0331970 A1 * | 11/2017 | Osanai | H04N 1/0032 |
| 2019/0052767 A1 * | 2/2019 | Nagano | H04N 1/00588 |

FOREIGN PATENT DOCUMENTS

| | | |
|---|---|---|
| JP | 2014086958 A | 5/2014 |
| JP | 2015126489 A | 7/2015 |
| JP | 2015164292 A | 9/2015 |

* cited by examiner

IMAGE READING UNIT

CROSS-REFERENCE TO RELATED APPLICATIONS

This patent application is a Continuation of U.S. patent application Ser. No. 15/348,782, filed on Nov. 10, 2016, which is based on and claims priority pursuant to 35 U.S.C. § 119(a) to Japanese Patent Application Nos. 2015-224123 filed on Nov. 16, 2015 and 2016-217265 filed on Nov. 7, 2016 in the Japan Patent Office, the entire disclosure of each of which is hereby incorporated by reference herein.

BACKGROUND

Technical Field

Embodiments of the present disclosure relate to an image-reading unit with an openable original document tray.

Related Art

In a known image-reading unit, a dedicated medium conveying slot and a conveying path for conveying a medium are employed to convey a hard medium, such as a credit card, etc. In addition, to either stack multiple cards or place an original document larger than the card, an openable original document tray is disposed at the dedicated medium conveying slot.

SUMMARY

One aspect of the present disclosure provides a novel image-reading unit that reads an image of an original document. The image-reading unit includes an original document conveyor that includes a first original document tray to hold an original document to be read, a first original document feeding port to feed the original document placed on the first original document tray, and an original document conveying path to convey the original document from the first original document feeding port to an original document discharging port. The original document conveyor further includes an openable second original document tray attached near an intermediate portion of the original document conveying path to hold an original document when opened, and a second original document feeding port to feed the original document on the second original document tray. The image-reading unit further includes an image reader to read an image of the original document being conveyed along the original document conveying path. The original document fed from the second original document feeding port is conveyed to the original document discharging port via a latter half portion of the original document conveying path. The second original document tray has a slot to receive an original document, and the slot is located facing the second original document feeding port when the second original document tray is closed to feed the original document through the slot and the second original document feeding port.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

In general, an original document tray employed in an image-reading unit is foldable to reduce the footprint of the image-reading unit while still long enough to enable guiding and feeding of an original document on the folded original document tray.

The original document tray of the image-reading unit includes a tray body and a moveable plate attached thereto. When space permits, the moveable plate is opened from the tray body and holds and feeds the original document to an original document feeding port along with two original document placing plates of the moving plate. When space is limited, the moving plate is closed and faces the tray body.

A slot is sometimes formed between the movable plate and the tray body to receive and guide the original document to the original document feeding port.

The image-reading unit generally does not include the dedicated conveying path to convey hard media, such as credit cards, etc. In addition, in the image-reading unit, the original document tray is simply folded in half, and is not closed.

Referring now to the drawings, wherein like reference numerals designate identical or corresponding member throughout the several views of the drawings, and in particular to FIGS. 1 and 2, an overall structure of an exemplary image-reading unit 1 is herein below described according to a first embodiment of the present disclosure.

Figure 1:
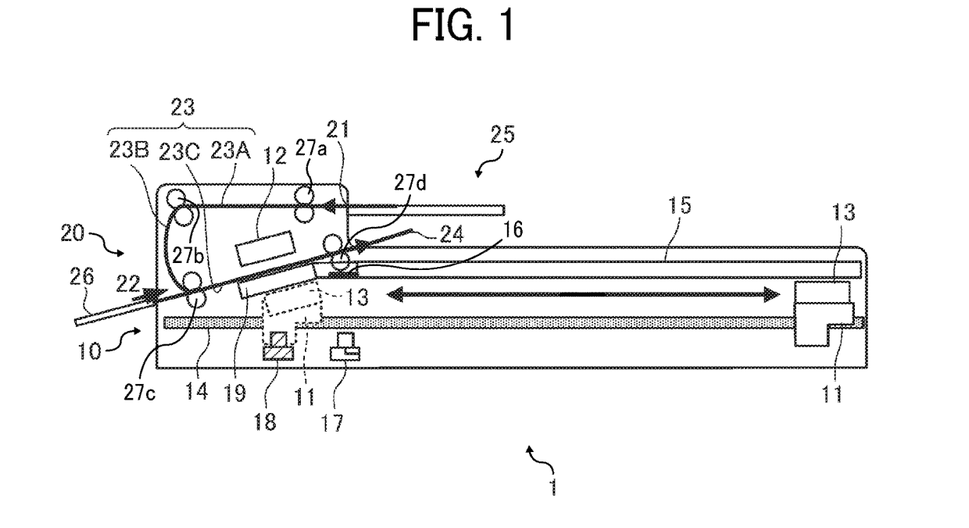
FIG. 1 is a traverse cross-sectional view illustrating an exemplary configuration of an image-reading unit according to one embodiment of the present disclosure.

FIG. 1 illustrates an aspect of a second openable original document tray 26 when the second openable original document tray 26 is opened. FIG. 2 illustrates another aspect of the second openable original document tray 26 when the second openable original document tray 26 is closed.

As shown in the drawings, the image-reading unit 1 includes an image reader 10 and an original document conveyor 20.

The image reader 10 includes a carriage 11, a flatbed contact glass 15, a white reference level providing sheet 16, and a document feed (herein after simply referred to as a DF) contact glass 19 inclined at a given angle θ or the like. The image-reading unit 1 is enabled to selectively operate in one of two modes. One mode is a DF scanner mode (or a conveyed original document-reading mode), in which an image of an original document is read when the original document is automatically conveyed. The other mode is a flatbed scanner mode (or a placed original document-reading mode), in which an image of an original document (e.g. an original document sheet, a cardboard, a book, etc.) is read when the original document is placed on the flat contact glass. In the flatbed scanner mode, the image reader 10 reads an image of the original document by irradiating an imaged surface of the original document placed on the flatbed contact glass 15 with light. The image reader 10 then collects and converts light reflected from the image surface of the original document into video signals.

In the DF scanner mode, the original document conveyor 20 separates, one by one, original documents S placed on a first original document tray 25 acting as an original document setting table. The original document conveyor 20 then conveys the original document S along the original document conveying path 23. The original document S then partially and continuously faces the DF contact glass 19 of the image reader 10 from a top of the original document S. The image-reading unit 1 sequentially reads an image of the original document S conveyed by the original document conveyor 20 at the DF contact glass 19 of the image reader 10 to act as the DF scanner.

The carriage 11 is enabled to move in a sub-scanning direction (i.e., left and right in the drawing) along a carriage rail 14 disposed in the image reader 10. The carriage 11 reciprocates from a sloped home position located on a left side as shown by a broken line to a right side in the drawing. On the carriage 11, a back reader 13 is mounted. Hence, across the flatbed contact glass 15, an image on a back of each of the original documents S is read. At the same time, above the DF contact glass 19, a front side reader 12 is provided to read an image of a front side of the original document S conveyed thereto. Hence, the carriage 11, the front side reader 12, and the back reader 13 collectively constitute an image reader according to one embodiment of the present disclosure.

As a sensor that detects a position of the carriage 11, a sloped home position sensor 18 and a FBS home position sensor 17 are provided and located below the carriage rail 14. The sloped home position sensor 18 is inclined at a given angle θ. The sloped home position sensor 18 detects whether or not the carriage 11 is present below the DF contact glass 19. The FBS home position sensor 17 detects whether or not the carriage 11 is present below a left side end of the flatbed contact glass 15. A white reference level providing sheet 16 is disposed on the flatbed contact glass 15 and reads white reference information to be used in white shading correction.

The original document conveyor 20 is disposed above the image reader 10 and includes a first original document tray 25, a first original document feeding port 21, an original document conveying path 23, a second original document tray 26, a second original document feeding port 22, and an original document discharge port 24

The first original document tray 25 holds original documents S with images as a reading target, especially original documents made of plain paper or like which allow reversal conveyance. The original document S placed on the first original document tray 25 is fed from the first original document feeding port 21, and is conveyed by each of a pair of conveying rollers 27a, 27b, 27c, and 27d along the original document conveying path 23. The original document S is finally discharged from the original document discharge port 24.

The original document conveying path 23 includes a front half path 23A extended from the first original document feeding port 21 to the pair of conveying rollers 27b. The original document-conveying path 23 also includes an intermediate original document-conveying path 23B located in the middle of the entire original document-conveying path 23 extended from the pair of conveying rollers 27b to the pair of conveying rollers 27c. The intermediate original document-conveying path 23B reverses the original document S. The original document-conveying path 23 further includes a straight original document-conveying path 23C almost linearly extended downstream of the pair of conveying rollers 27c. With this, the original document S is almost linearly conveyed, accordingly. Hence, the original document S is conveyed along the original document-conveying path 23 in a direction as shown by arrows in FIG. 1.

The second original document tray 26 is attached to the image-reading unit 1 near the intermediate original document-conveying path 23B. When the second original document tray 26 is opened, the second original document tray 26 is enabled to hold one or more original documents S such as cards, etc., that are difficult to convey along a reverse original document-conveying path as described above. Although it mainly holds the one or more hard original documents, the second original document tray 26 may hold another type of original document such as a plain paper sheet, etc., as well. Here, in this example, the card is one of an ID card (a personal Identification card) and a fare card or the like. The second original document feeding port 22 is enabled to feed the original document S placed on the second original document tray 26.

The original document S fed from the second original document feeding port 22 is conveyed toward the original document discharge port 24 through the straight original document-conveying path 23C located downstream of the intermediate original document-conveying path 23B. The straight original document-conveying path 23C constitutes the second half of the present disclosure. When the second original document tray 26 is opened as shown in FIG. 1, because a placing surface of the second original document tray 26 and the straight original document-conveying path 23C extend almost on the same plane, the hard original document S such as a card, etc., placed on the second original document tray 26 can be precisely and smoothly conveyed to the original document discharge port 24 without bending.

Figure 2:
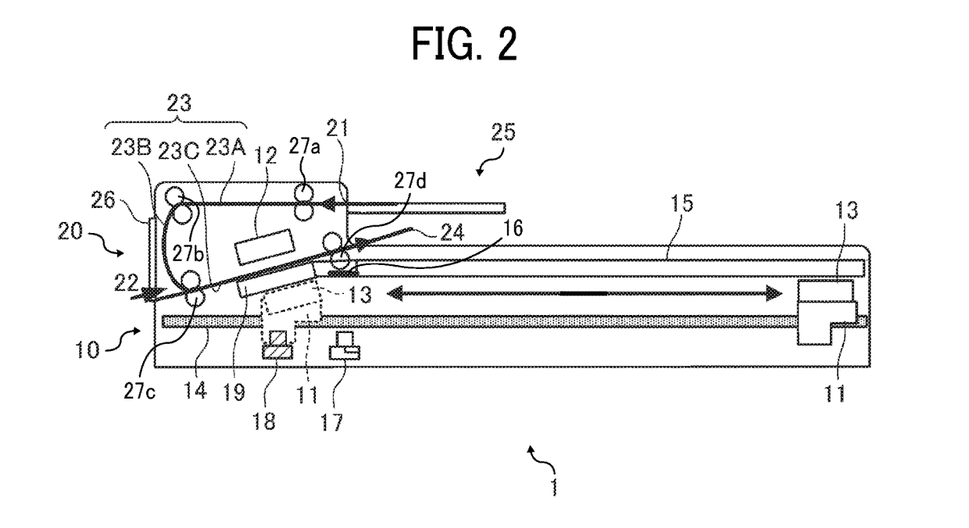
FIG. 2 is also a cross-sectional view illustrating an exemplary configuration of the image-reading unit of FIG. 1 when a second original document tray is closed according to one embodiment of the present disclosure.

In addition, when the second original document tray 26 is closed as shown in FIG. 2, since the second original document tray 26 adheres to an external surface of the image-reading unit 1, the footprint of the image-reading unit can be more effectively reduced when compared with a situation as shown in FIG. 1.

In addition, the second original document tray 26 includes a slot 26A as described next. Thus, even though the second original document tray 26 is closed, an original document S can be fed from the second original document feeding port 22.

Figure 3:
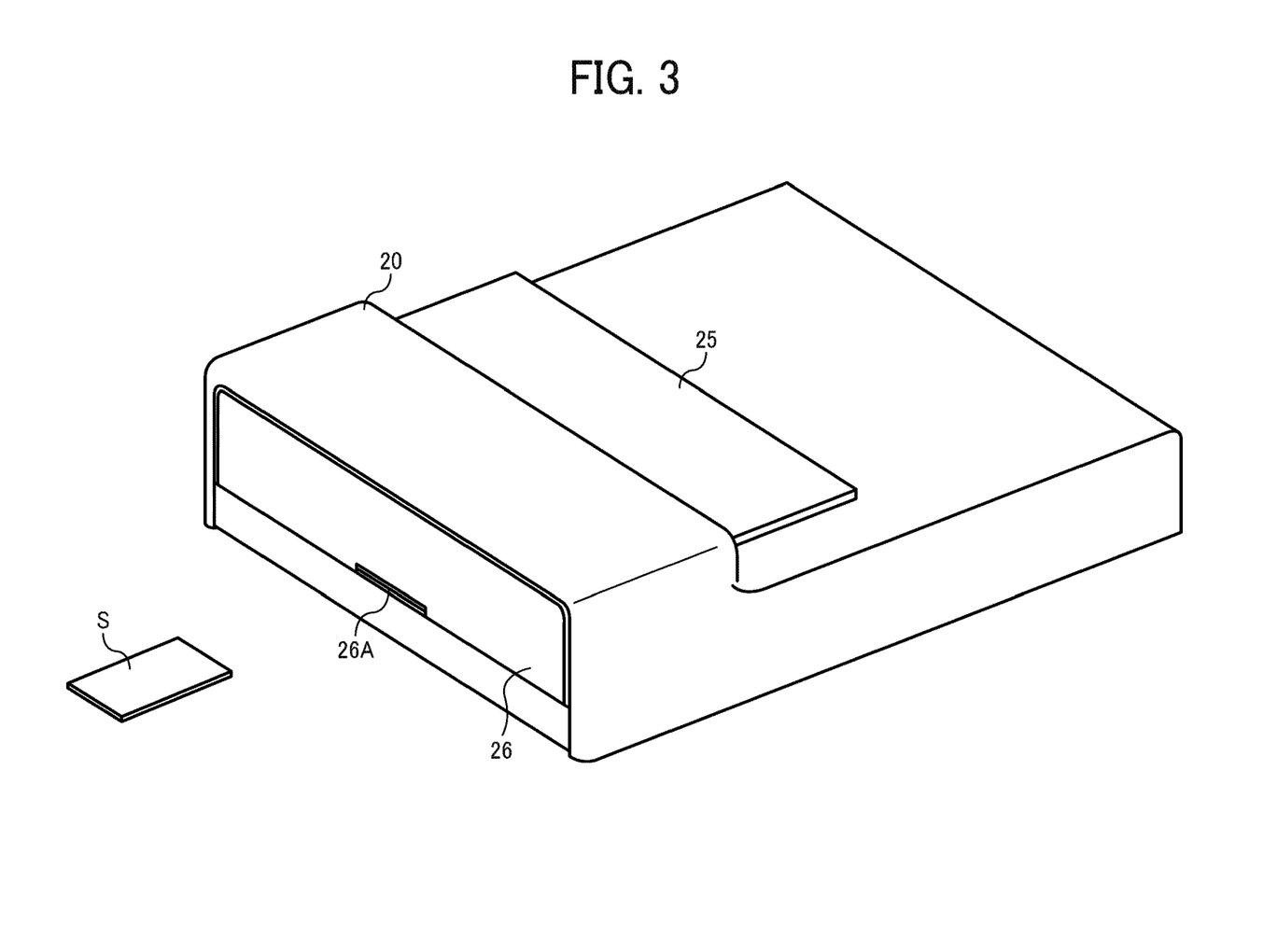
FIG. 3 is a perspective view illustrating the image-reading unit of FIGS. 1 and 2 when the second original document tray is closed.
Figure 4:
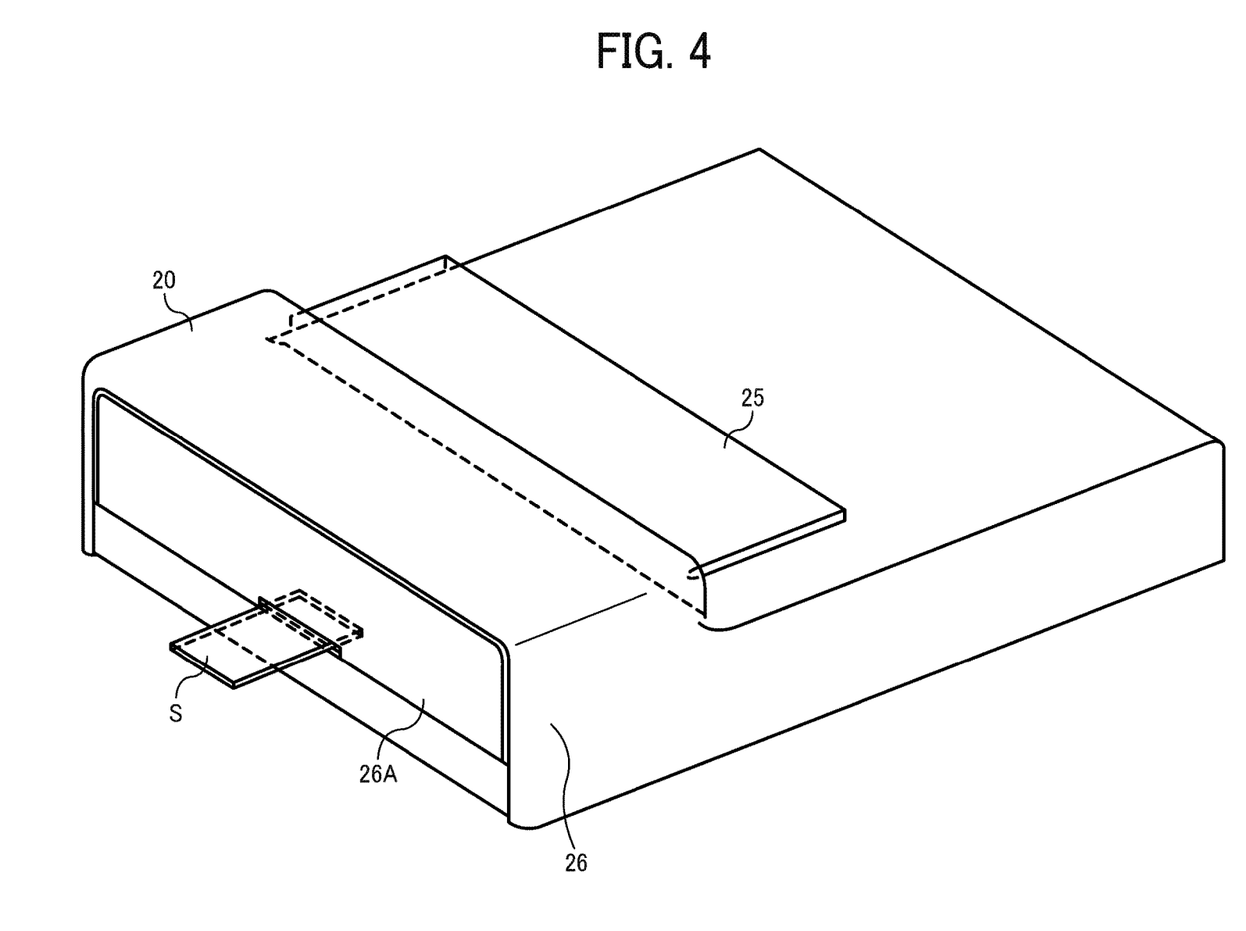
FIG. 4 is a perspective view illustrating the image-reading unit of FIGS. 1 and 2 when the second original document tray is closed and an original document is inserted at the time.
Figure 5:
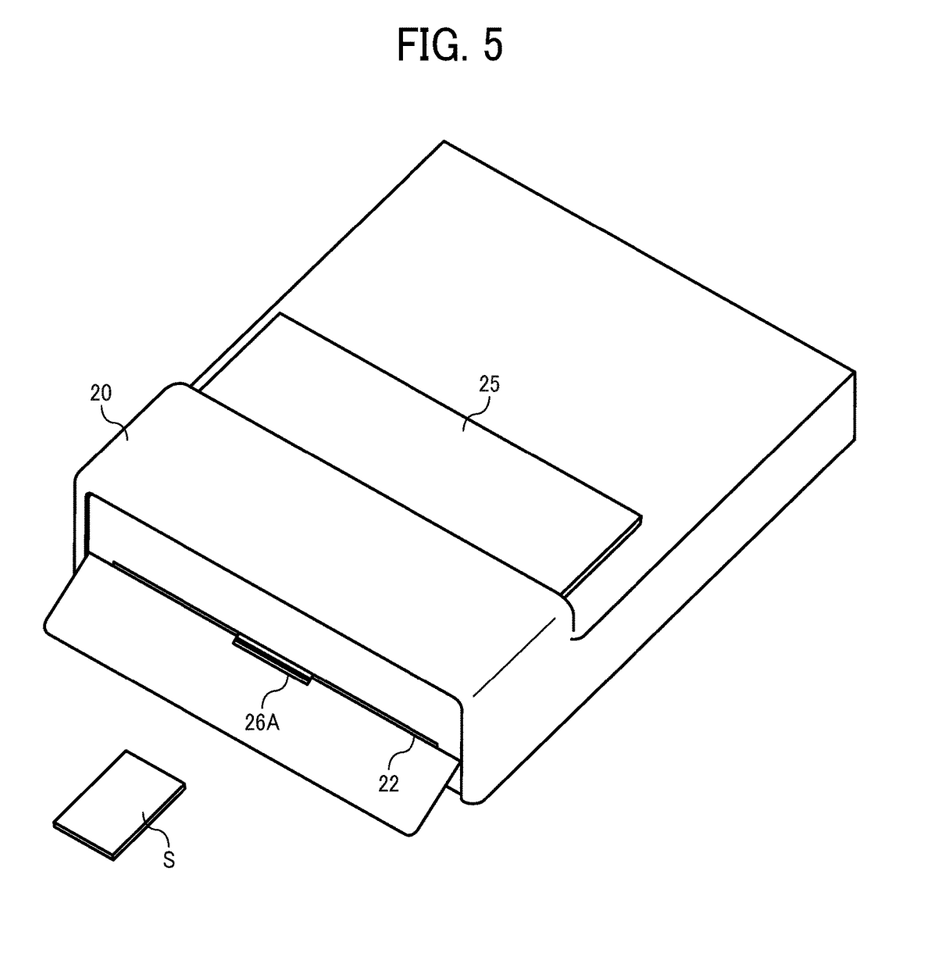
FIG. 5 is a perspective view illustrating the image-reading unit of FIGS. 1 and 2 when the second original document tray is opened.

The second original document tray 26 is described more in detail with reference to FIGS. 3 to 5.

FIG. 3 is a perspective view of the original document conveyor 20, when the second original document tray 26 is closed. The second original document tray 26 has the slot 26A to receive an original document S, such as a card, etc. Since the slot 26A is enabled to face the second original document feeding port 22 when the second original document tray 26 is closed, the original document S can reach and is fed from the second original document feeding port 22 through the slot 26A as shown in FIG. 4. A width and a height of the slot 26A may be sized as required.

Since the original document S can reach and is fed from the second original document feeding port 22 through the slot 26A when the second original document tray 26 is closed, opening the second original document tray 26 before feeding the original document S can be saved, resulting in enhancing user friendliness.

FIG. 5 is a perspective view illustrating another aspect of the original document conveyor 20 when the second original document tray 26 is opened. In this state, when an operator stacks an original document S on the second original document tray 26 and feeds the original document S to and from the second original document feeding port 22. To feed an original document S wider than the card or the like, a width of the second original document feeding port 22 is almost the same as the second original document tray 26. Since the solid media, such as cards, etc., are frequently fed from the second original document feeding port 22 as the original document S, the straight original document-conveying path 23C (as shown in FIG. 1) provides a path to convey the original document S. Because of this, an inclination of the original document placing surface of the second original document tray 26 is almost equivalent to that of the straight original document-conveying path 23C, and the original document placing surface of the second original document tray 26 and the straight original document-conveying path 23C extend almost on the same plane. With this, the original document S placed on the second original document tray 26 can be precisely conveyed to the original document discharge port 24 without bending the original document S.

As described heretofore, the image-reading unit 1 according to one embodiment of the present disclosure includes the first original document tray 25 to hold the original document S with the image acting as a reading objective, the first original document feeding port 21 to feed the original document S stacked on the first original document tray 25, and the original document-conveying path 23 to convey the original document S from the first original document feeding port 21 to the original document discharge port 24. In addition, the image-reading unit 1 according to one embodiment of the present disclosure also includes the second original document tray 26 attached near the intermediate original document-conveying path 23B of the original document-conveying path 23 to hold the original document S when the second original document tray 26 is opened, the original document conveyor 20 having the second original document feeding port 22 to feed the original document S placed on the second original document tray 26, and the carriage 11 to read the image of the original document during transportation of the original document along the original document-conveying path 23.

The original document S fed from the second original document feeding port 22 is conveyed through the straight original document-conveying path 23C to the original document discharge port 24. The second original document tray 26 has the slot 26A to receive the original document S. Since the original document slot 26A faces the second original document feeding port 22 when the second original document tray 26 is closed, the original document S can reach and is fed from the second original document feeding port 22 through the slot 26A.

With this, even though the second original document tray 26 is closed regarding the image-reading unit 1, since the slot 26A faces the original document feeding port 22 and accordingly the original document feeding port 22 is not blocked, the original document S can precisely and safely reach and is fed from the original document feeding port 22 through the slot 26A.

Hence, this system in which the original document S is fed even when the second original document tray 26 is closed is smaller than another system in which the second original document tray 26 is opened to feed the original document S. In addition, since the original document can be fed from the second original document feeding port 22 without opening the second original document tray 26, opening the second original document tray 26 is saved, usability is upgraded.

Now, a second embodiment of the present disclosure is herein below described with reference to FIGS. 6 to 8C.

A configuration of an image-reading unit 1 of this embodiment of the present disclosure is basically the same as that of the first embodiment except for a pair of guides or the like provided in the second original document tray 26 of this embodiment of the present disclosure. Hence, the same signs are used as in the first embodiment as illustrated in FIGS. 1 to 4 and are assigned to the same devices employed in the second embodiment. Hence, only noted differences from the first embodiment of the present disclosure are herein below described in greater detail.

Figure 6:
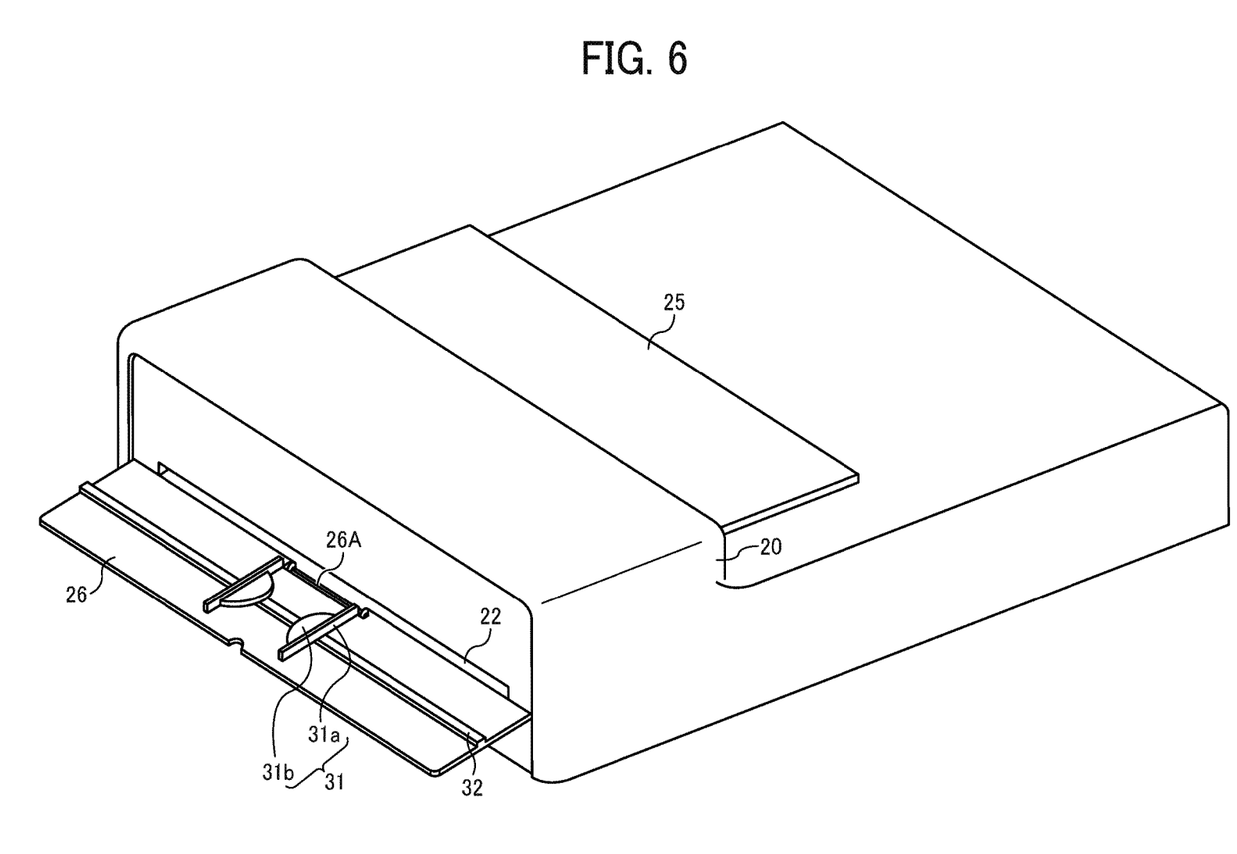
FIG. 6 is a perspective view illustrating an exemplary image-reading unit when a second original document tray is opened according to a second embodiment of the present disclosure.

FIG. 6 is a perspective view illustrating the original document conveyor 20 when the second original document tray 26 is opened. The second original document tray 26 includes the slot 26A, a pair of guides 31, a guide rail 32, a notch 33, a pair of tray hinges 34 (see FIG. 8A), and a pair of slot hinges 35 (see FIGS. 8A to 8C) as well.

Figure 7:
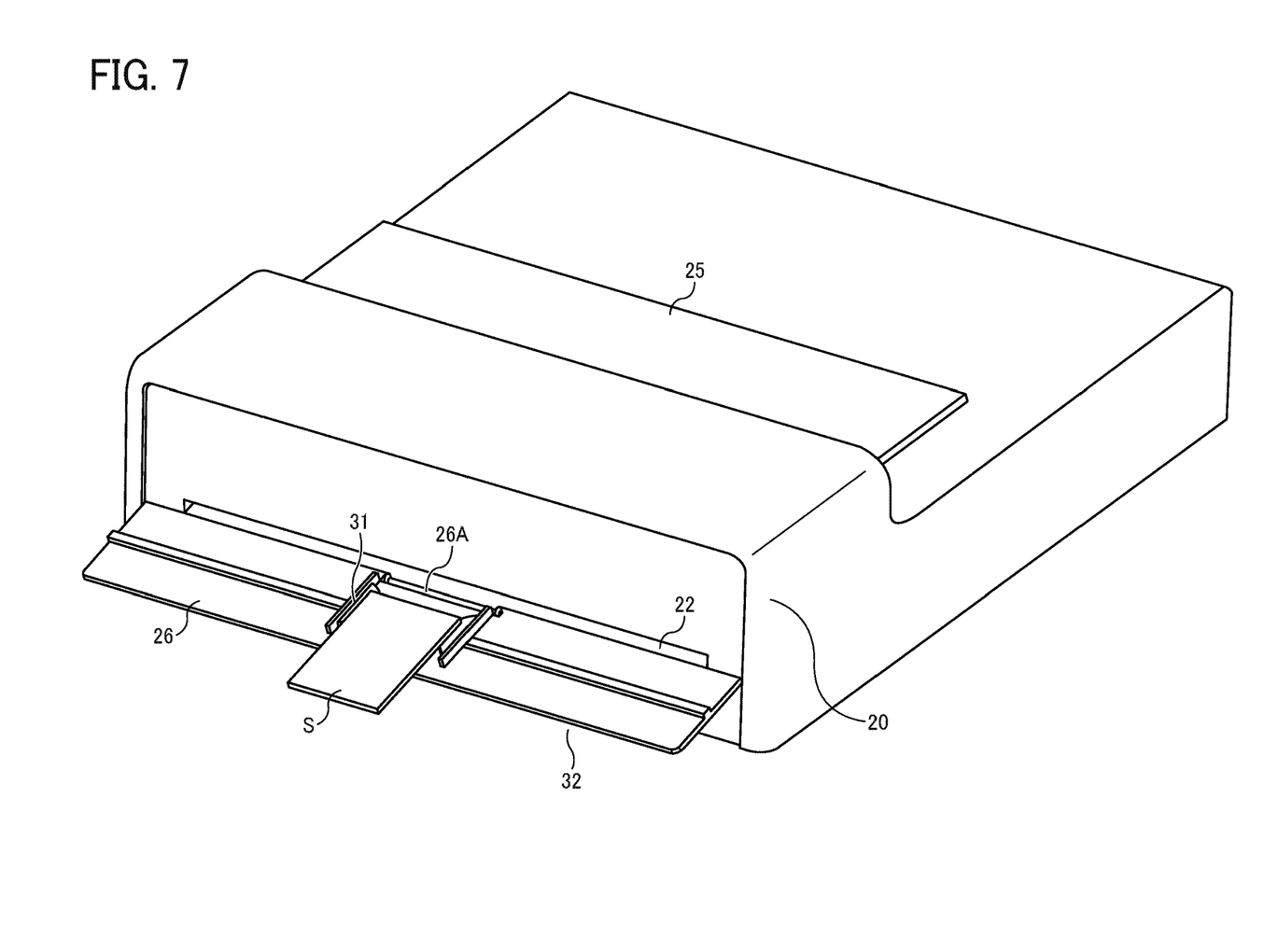
FIG. 7 is a perspective view illustrating the image-reading unit of FIG. 6 when the second original document tray is opened and an original document is placed at the time according to the second embodiment of the present disclosure.

Each of the pair of guides 31 includes a rectangular bar 31a and a semicircular plate 31b. The pair of rectangular bars 31a extends in a conveying direction of the original document S. The pair of rectangular bars 31a aligns the original document stacked on the second original document tray 26 from both sides thereof perpendicular to the conveying direction of the original document S to guide and linearly insert the original document into the second original document feeding port 22. The pair of guides 31 is movable perpendicular to the conveying direction of the original document S along the guide rail 32 corresponding to a width of the original document. The semicircular plate 31b is disposed near a center of an inner side of each of the pair of rectangular bars 31a opposed to each other to collectively support the original document S from below the original document S (as shown in FIG. 7).

The guide rail 32 is linear and extends perpendicular to the conveying direction of the original document. The guide rail 32 is enabled to hold the pair of guides 31 and allows the pair of guides 31 to move. A semicircular notch 33 is formed on the second original document tray 26 at an opposite end to the slot 26A of the second original document tray 26. The semicircular notch 33 is formed by partially clipping the second original document tray 26 out. Hence, an operator can readily pinches the notch 33 and accordingly easily open the second original document tray 26 when feeding the original document S from the second original document tray 26.

In general, a relatively large notch 33 eases opening of the second original document tray 26.

However, when a width of the notch 33 is larger than that of the original document S, the original document S placed on the second original document tray 26 becomes unstable. When the pair of guides 31 is moved to decrease the width of the pair of guides 31, the pair of guides 31 and the notch 33 should not interfere with each other.

Hence, provided that the notch 33 is sized so as to be narrower than the width of the original document S, it may be of any width that does not interfere the pair of guides 31.

The pair of tray hinges 34 (shown in FIG. 8A) is disposed perpendicular to the direction of insertion of the original document S at two widthwise ends of a linking portion at which the second original document tray 26 is connected to a body of the original document conveyor 20, respectively. Hence, since it swings regarding the original document conveyor 20, the second original document tray 26 can be opened and closed.

Figure 8A:
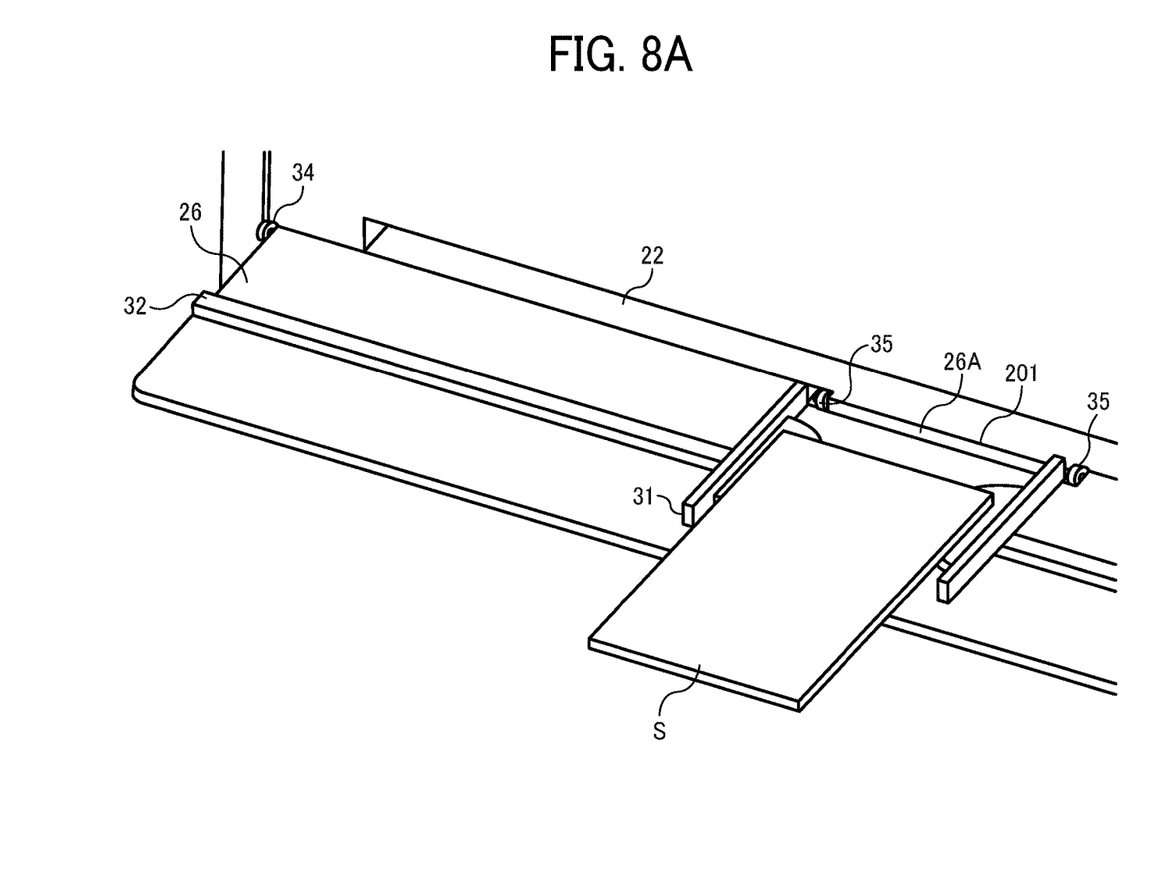
FIG. 8A is an enlarged perspective view schematically illustrating the image-reading unit of FIG. 7 when the second original document tray is opened.

The pair of slot hinges 35 is also disposed perpendicular to the insert direction of the original document S at both ends of the slot 26A, respectively. Accordingly, the second original document tray 26 totally includes four hinges connected to the original document conveyor 20.

FIG. 8A is an enlarged view of FIG. 7 more clearly illustrating the pair of tray hinges 34 and the pair of slot hinges 35 as well.

Figure 8B:
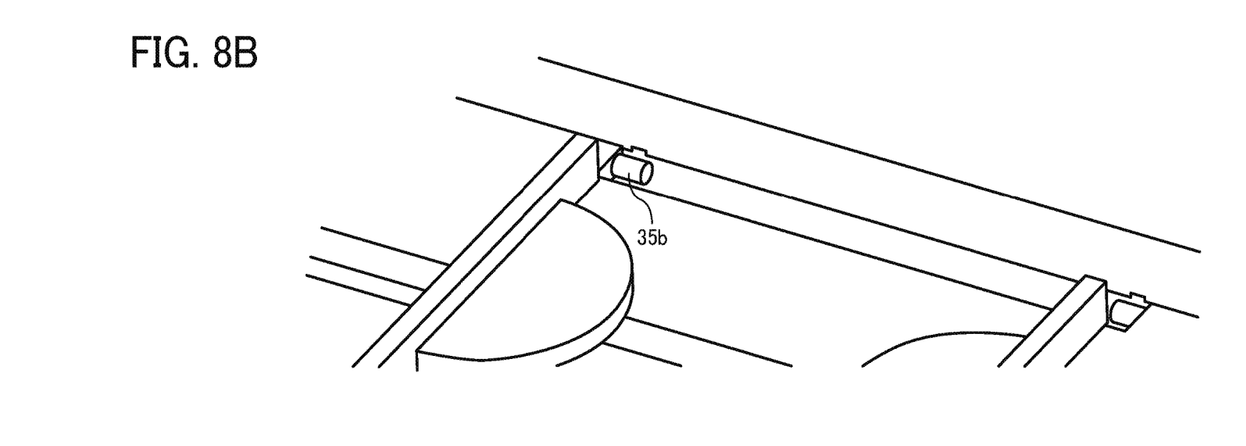
FIGS. 8B and 8C are enlarged perspective views collectively illustrating an exemplary hinge mechanism employed in the second original document tray of the image-reading unit of FIG. 7.

A size of an opening of the slot 26A is preferably smaller in view of placing the original document S precisely on the second original document tray 26 when the second original document tray 26 is opened. Hence, a projection 201 is formed to protrude from the body of the original document conveyor 20 to the second original document tray 26 as shown in FIG. 8A. Consequently, when the second original document tray 26 is opened, the projection 201 enters and occupies the opening of the slot 26A to decrease the size of the opening of the slot 26A as shown in FIGS. 8A and 8B.

Figure 8C:
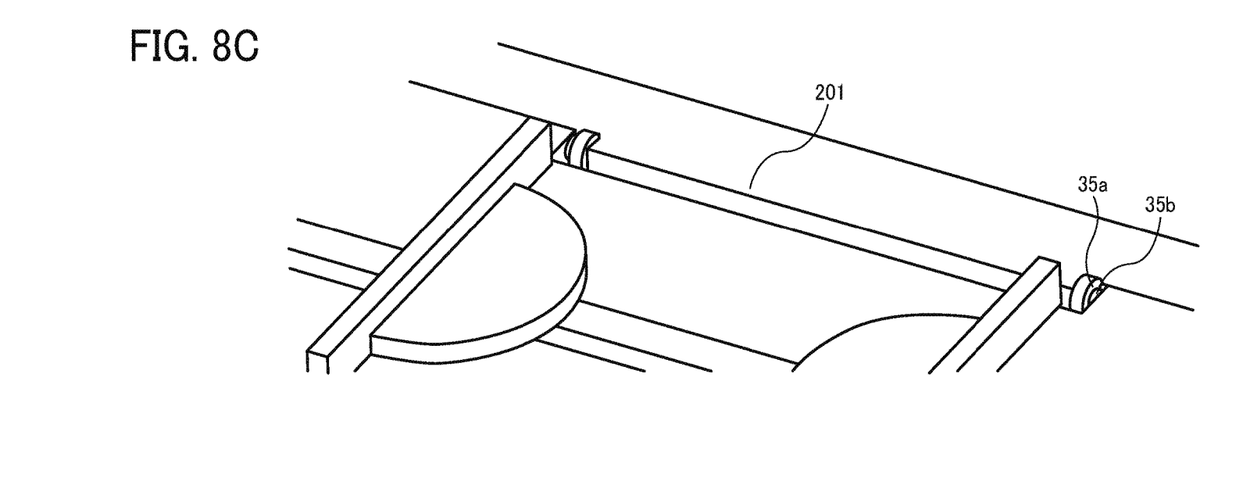

When the slot 26A is formed in the second original document tray 26, the strength of the second original document tray 26 likely deceases. To resolve such a problem, the number of hinges is increased to increase the strength of the second original document tray 26. That is, the pair of slot hinges is provided in addition to the pair of tray hinges 34 as well in this embodiment of the present disclosure. An exemplary structure of the pair of slot hinges is illustrated in FIGS. 8A, 8B, and 8C. Specifically, a pair of slot hinge holes 35a is attached to widthwise ends of the projection 201. A pair of slot hinge pins 35b is also attached to the second original document tray 26 to protrude toward the slot 26A thereby entering the pair of slot hinge holes 35a, respectively, as shown in FIG. 8B. In FIG. 8B, the projection 201 is omitted to expose and readily illustrate and describe the pair of slot hinge pins 35b.

As described heretofore, the image-reading unit 1 according to the one embodiment of the present disclosure has the straight original document-conveying path 23C substantially extended on a flat plane. The second original document tray 26 includes the pair of movable guides 31 to align the original document S there between. The placing surface on to which the original document S is placed and the straight original document-conveying path 23C extend on substantially the same plane.

With these configurations, since the pair of guides 31 guides the original document S placed on the second original document tray 26, even though the original document S is the relatively small card or the like, the original document S can be safely precisely conveyed without distortion. In addition, since the placing surface of the original document S and the flat plane of the straight original document-conveying path 23C extend on substantially the same plane, even though the original document S is hard, such as the card, etc., the original document S can be safely and precisely conveyed without being bent. In addition, since the pair of guides 31 is movable, a width of the pair of guides 31 can be precisely set in accordance with a size of the original document S. Consequently, the original document S can be precisely guided.

In addition, since the second original document tray 26 is connected to the original document conveyor 20 via the pair of tray hinges disposed perpendicular to the conveying direction of the original document S at the both widthwise ends of the linking portion in which the second original document tray 26 connects to the original document conveyor 20, these hinges can strengthen the second original document tray 26. In addition, since the second original document tray 26 is connected to the original document conveyor 20 via the pair of slot hinges disposed perpendicular to the insertion direction of the original document S at the both side ends of the slot 26A, respectively, in addition to the above-described pair of tray hinges, the strength of the second original document tray 26 effectively increases.

Figure 9:
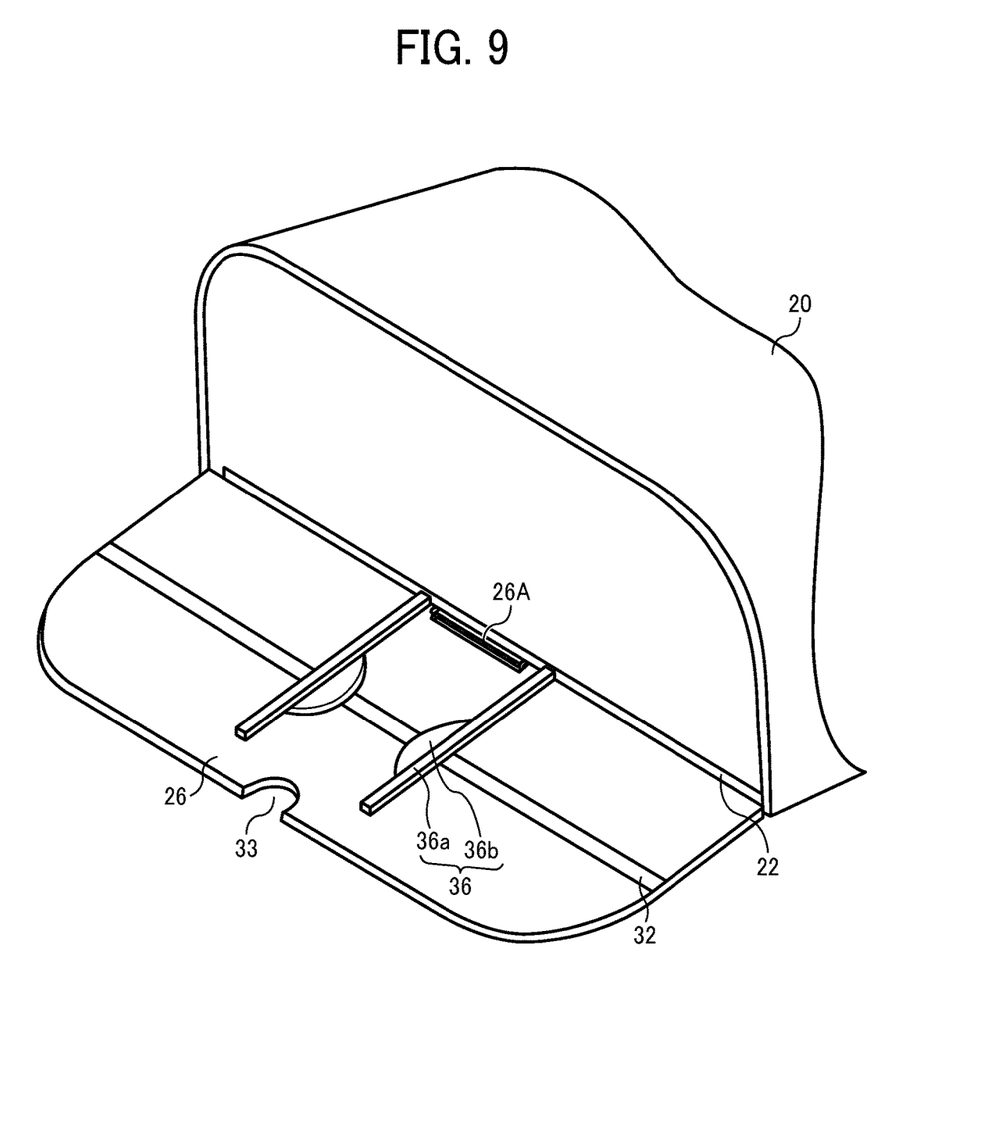
FIG. 9 is a perspective view illustrating an image-reading unit when a second original document tray is opened according to a third embodiment of the present disclosure.
Figure 10:
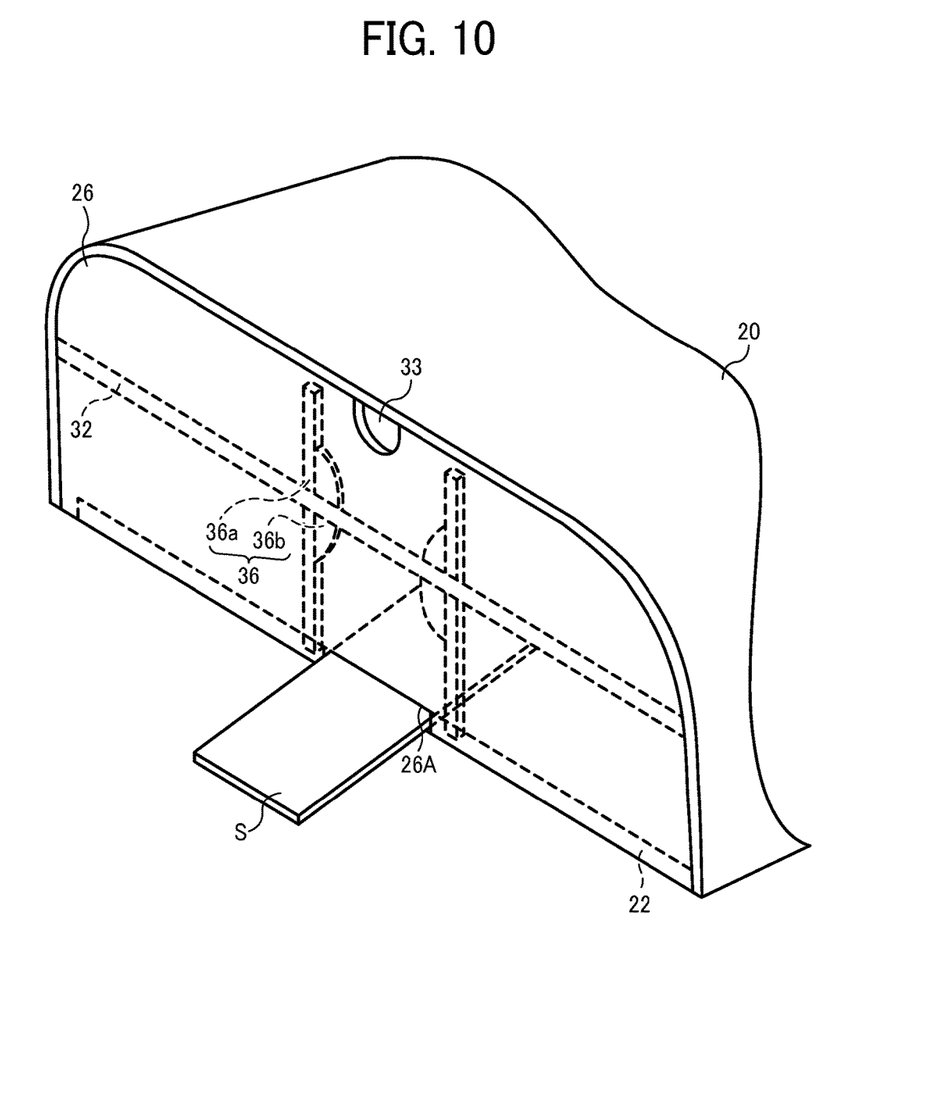
FIG. 10 is a perspective view illustrating the image-reading unit of FIG. 9 when the second original document tray is closed and an original document is inserted at the time.

Now, a third embodiment of the present disclosure is herein below described with reference to FIGS. 9 and 10.

As illustrated, an image-reading unit 1 of the third embodiment of the present disclosure has basically the same configuration as the second embodiment except for a pair of guides disposed on the second original document tray 26 in the third embodiment. Thus, the same signs are assigned to the same configurations in the third embodiment as in the second embodiment as illustrated in FIGS. 6 to 8C, and only noted differences are herein below described in greater detail with reference to applicable drawings.

The pair of guides 36 disposed on the second original document tray 26 includes a pair of rectangular bars 36a and a pair of semicircular plates 36b, respectively to guide the original document S placed on the second original document tray 26. As illustrated in FIG. 9, the pair of elongated rectangular bars 36a is employed as different from the second embodiment. Specifically, an end of each of the pair of elongated rectangular bars 36a extends close to the body of the original document conveyor 20. With this, as shown in FIG. 10, even when the second original document tray 26 is closed, the pair of elongated rectangular bars 36a can yet guide the original document S into the slot 26A. At this moment, the pair of guides 36 (e.g., the pair of elongated rectangular bars 36a) moves on the guide rail 32 in accordance with a width of the original document S and regulates the width of the original document S allowed to enter the slot 26A. In addition, when the second original document tray 26 is opened, the pair of elongated rectangular bar 36a guides the original document S as always as in the second embodiment of the present disclosure.

As described heretofore, the image-reading unit 1 according to the third embodiment of the present disclosure, in every situation in which the second original document tray 26 is closed and opened, the width of the pair of elongated rectangular bars 36a is adjusted to correspond to the width of the slot 26A and precisely guides the original document S. With this configuration, the pair of guides 31 can guide the original documents of any size regardless of the size of the slot 26A even when the second original document tray 26 is closed. Since the original document is fed even when the second original document tray 26 is closed, the footprint of the image-reading unit 1 is minimized, and a time for opening the second original document tray 26 can be saved thereby upgrading usability as well.

According to one aspect of the present disclosure, the footprint of the image-reading unit can be minimized while upgrading the usability, and can be advantageously applied to a common image-reading unit.

That is, according to one embodiment of the present disclosure, a novel image-reading unit reads an image of an original document. The image-reading unit includes an original document conveyor that includes a first original document tray to hold an original document to be read, a first original document feeding port to feed the original document placed on the first original document tray, and an original document-conveying path to convey the original document from the first original document feeding port to an original document discharging port. The original document conveyor further includes an openable second original document tray attached near an intermediate portion of the original document-conveying path to hold an original document when opened, and a second original document feeding port to feed the original document on the second original document tray. The image-reading unit further includes an image reader to read an image of the original document being conveyed along the original document-conveying path. The original document fed from the second original document feeding port is conveyed to the original document discharging port via a latter half portion of the original document-conveying path. The second original document tray has a slot to receive an original document, and the slot is located facing the second original document feeding port when the second original document tray is closed to feed the original document through the slot and the second original document feeding port.

According to another aspect of the present disclosure, the footprint of the image-reading unit can be more effectively minimized while upgrading the usability, and can be advantageously applied to a common image-reading unit.

That is, according to one embodiment of the present disclosure, a pair of movable guides is disposed on the second original document tray to align the original document set onto the second original document tray when the second original document tray is opened. The latter half of the original document-conveying path is substantially flat and extends from an original document placing plane (of the second original document tray) substantially on the same plane as the original document placing plane.

According to yet another aspect of the present disclosure, the footprint of the image-reading unit can be more effectively minimized while upgrading the usability, and can be advantageously applied to a common image-reading unit.

That is, the second original document tray is connected to the original document conveyor at a linking portion via a first pair of hinges respectively disposed perpendicular to a direction in which the original document is inserted at both ends of the linking portion. The second original document tray is also connected to the original document conveyor via a second pair of hinges respectively disposed at both ends of the slot disposed in the same direction as the first pair of hinges.

According to yet another aspect of the present disclosure, the footprint of the image-reading unit can be more effectively minimized while upgrading the usability, and can be advantageously applied to a common image-reading unit.

That is, the pair of movable guides regulates a width of the slot and guides the original document set onto the second original document tray both when the second original document tray is opened and closed.

Numerous additional modifications and variants of the present disclosure are possible in light of the above teachings. It is therefore to be understood that within the scope of the appended claims, the present disclosure may be practiced otherwise than as specifically described herein. For example, the image-reading unit is not limited to the above-described various embodiments and modifications may be made as appropriate.

What is claimed is:

1. An image reading apparatus comprising:
   a first tray configured to stack a first original document;
   an openable second tray including a slot and configured to stack a second-original document when the openable second tray is opened; and
   an image reader configured to read an image of at least one of the first original document and the second original document,
   wherein a second conveying path from the second openable tray toward the image reader joins a first conveying path from the first tray toward the image reader at a position upstream from the image reader in a conveying direction of the second original document, and
   wherein the second original document inserted into the slot is configured to be conveyed to the image reader when the openable second tray is closed.

2. The image reading apparatus according to claim 1, wherein the openable second tray includes a pair of guides to align the second original document slacked on the openable second tray from both sides of the second original document in a direction perpendicular to the conveying direction of the second original document.

3. The image reading apparatus according to claim 1, wherein the openable second tray includes a hinge and is rotatable about the hinge.

4. The image reading apparatus according to claim 1, wherein the second original document is configured to be conveyed linearly from the openable second tray to the image reader.

5. The image reading apparatus according to claim 1, further comprising a feeding port from which the second original document on the openable second tray is to be fed.

6. The image reading apparatus according to claim 5, wherein a width of the slot is narrower than a width of the feeding port.

7. The image reading apparatus according to claim 5, wherein the slot faces the feeding port when the openable second tray is closed.

8. The image reading apparatus according to claim 1, further comprising a discharge port from which at least one of the first original document and the second original document is to be discharged.

9. The image reading apparatus according to claim 1, wherein the openable second tray is inclined upward in the conveying direction of the second original document when the openable second tray is opened.

* * * * *